C. FULDE.
BAKER'S DRIP PAN.
APPLICATION FILED JAN. 10, 1912.

1,025,971.

Patented May 14, 1912.

Witnesses:

Inventor
Charles Fulde
By his Attorneys

UNITED STATES PATENT OFFICE.

CHARLES FULDE, OF NEW YORK, N. Y.

BAKER'S DRIP-PAN.

1,025,971.  Specification of Letters Patent.  Patented May 14, 1912.

Application filed January 10, 1912. Serial No. 670,372.

*To all whom it may concern:*

Be it known that I, CHARLES FULDE, a citizen of Germany, residing at New York city, county and State of New York, have invented a new and Improved Baker's Drip-Pan, of which the following is a specification.

This invention relates to a baker's drip pan of novel construction, in which the paper sheets and the strainer used in French cruller baking are so supported that the fat may freely drip off the strainer in front of the sheets, and that both the strainer and sheets may be readily introduced and removed.

Figure 1:
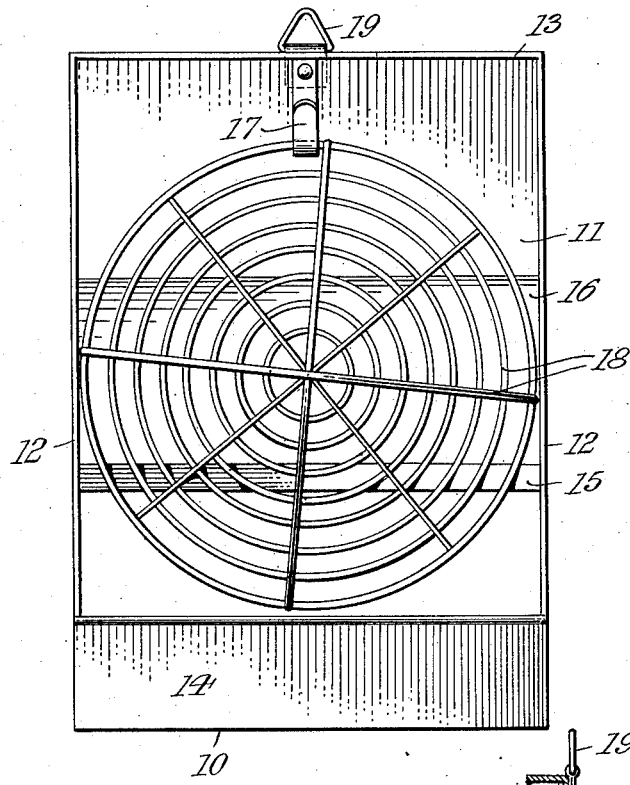
Figure 2:
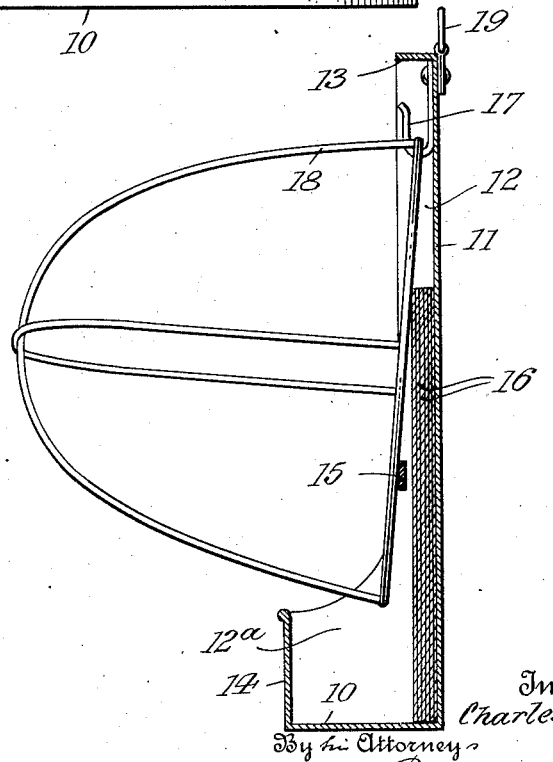

In the accompanying drawing: Figure 1 is a front elevation of a drip pan embodying my invention, and Fig. 2 a vertical cross section thereof.

The pan is composed of a bottom 10, a high back 11, narrow sides 12, and a narrow top 13. The sides 12 are widened at their lower ends as at 12$^a$, and these widened sections are provided with a front 14. Thus with the construction described, there is formed at the bottom of the pan a forwardly extending trough, while the pan above such trough is open along its entire front. Transversely across the pan, there extends a spacing bar 15, that connects the sides 12 with each other at a short distance above their widened sections 12$^a$. This bar is placed at such a distance from back 11 as to form an opening therebetween adapted to accommodate the paper sheets 16. These sheets are placed into the pan behind the spacing bar, which thus maintains them in an upright position with the lower edges dipping into the trough. At its upper end the pan is provided with a hook 17 which is centered on back 11 directly below top 13. This hook serves for the suspension of the strainer 18, the lower end of which is held off sheets 16 by the spacing bar 15, so that the grease may drip freely into the trough in front of said sheets. An eye 19 serves for securing the pan to the wall.

In use the dough batches are placed upon the bottom of the strainer together with one of the paper sheets and then the strainer is steeped into the boiling grease pot. After the baking operation has been completed, the paper sheet is removed and placed into the pan behind bar 15, while the strainer is suspended from hook 17 in front of such bar, so that the fat may drip freely into the trough. It will be seen that both the strainer and sheets are within convenient reach of the baker, may be quickly stored, and will not interfere with each other during storage.

I claim:

A baker's drip pan comprising a back plate, a trough at the lower end thereof, side plates that close the ends of the trough and have upper sections that extend upwardly along the ends of the back plate, said upper sections being of less width than their lower trough-closing sections, a transverse spacing bar secured to the upper side-sections and set back from the front of the trough, and a hook carried by the back plate above the spacing bar whereby a paper-receiving slot is formed between the back plate and spacing bar, while said bar is adapted to deflect an article suspended from the hook away from the slot and toward the front of the trough.

CHARLES FULDE.

Witnesses:
FRANK V. BRIESEN,
KATHERYNE KOCH.

Copies of this patent may be obtained for five cents each, by addressing the "Commissioner of Patents, Washington, D. C."